United States Patent [19]

Unrau

[11] Patent Number: 4,947,918

[45] Date of Patent: Aug. 14, 1990

[54] TIRE CHANGER

[76] Inventor: Jacob J. Unrau, Box 617, Ile des Chenes, Manitoba, Canada, R0A 0T0

[21] Appl. No.: 394,671

[22] Filed: Aug. 16, 1989

[51] Int. Cl.⁵ ............................................. B60C 25/08
[52] U.S. Cl. .................................................. 157/1.22
[58] Field of Search ....................................... 151/1.22

[56] References Cited

U.S. PATENT DOCUMENTS

| 2,900,017 | 8/1959 | Lewis | 157/1.22 |
| 2,903,050 | 9/1959 | Lewis | 157/1.22 |
| 4,425,954 | 1/1984 | Ogren | 157/1.22 |

FOREIGN PATENT DOCUMENTS 294744 4/1932 Italy .................................. 157/1.22

Primary Examiner—James G. Smith
Attorney, Agent, or Firm—Murray E. Thrift; Stanley G. Ade; Adrian D. Battison

[57] ABSTRACT

A pneumatic tire changer has a base that engages one side of a wheel. Two bead deflecting tools engage either under or over a bead depending on whether a tire is to be removed or installed. The tools are then rotated in opposite directions on the base to force the bead over the rim. The changer is a portable, manually operated tool.

10 Claims, 4 Drawing Sheets

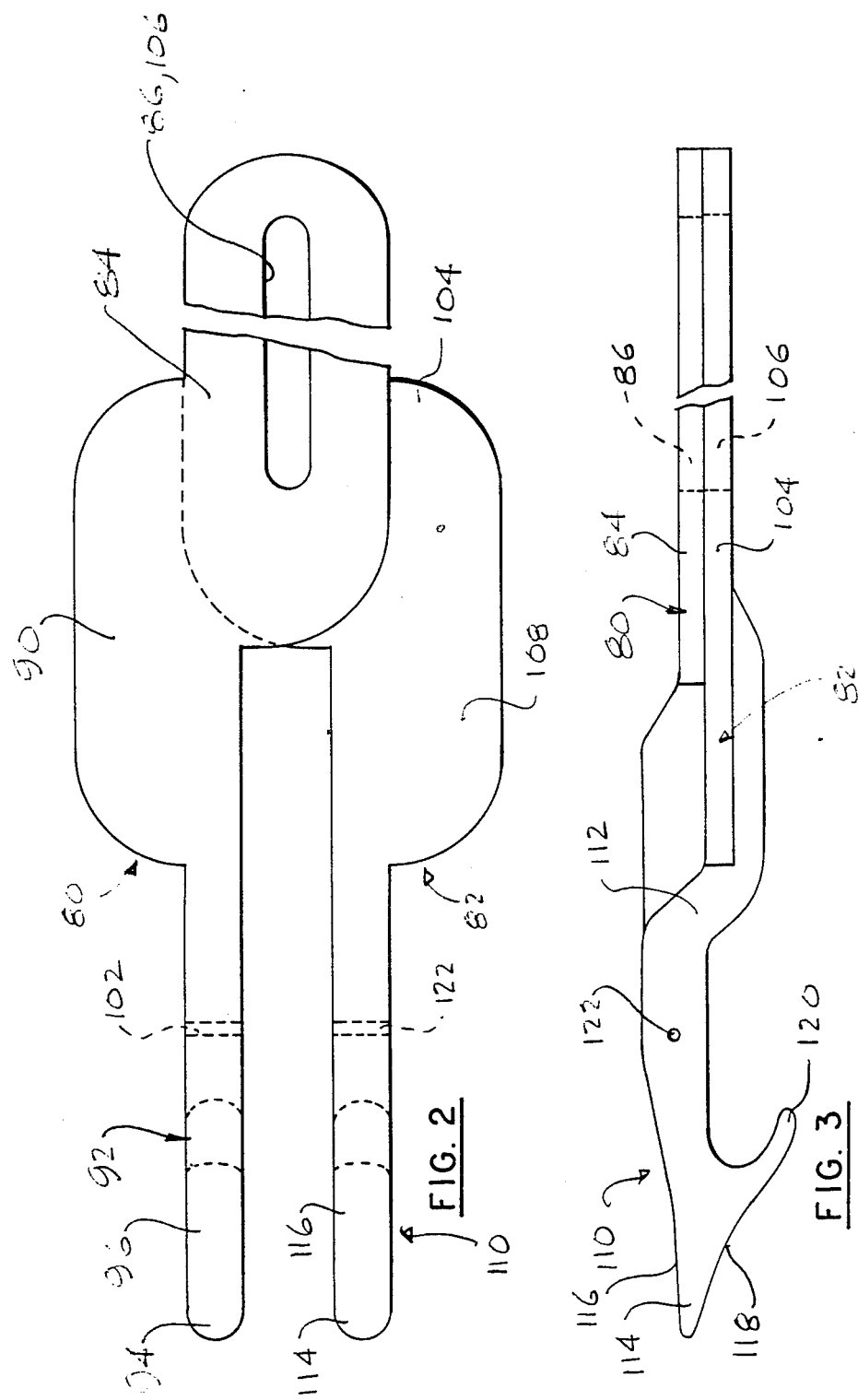

TIRE CHANGER

FIELD OF THE INVENTION

The present invention relates to tire changers and more particularly to portable apparatus for mounting and dismounting pneumatic tires on wheels.

BACKGROUND

The pneumatic tires currently used on automobiles and trucks have stiff, inelastic beads that are not readily forced over a wheel rim during installation or removal. In consequence, tires are usually changed using large, power operated changers. There is a need, however, for a small portable changer that can be carried in a vehicle as part of a repair kit. Such a device would be very useful in situations where there was little or no access to a fully equipped repair shop. It would also be used for field repairs, for example in agricultural operations such as seeding or harvest where considerable down time for trucks and equipment is unacceptable.

It is therefore the objective of the present invention to provide a portable tire changer.

SUMMARY

According to the present invention there is provided a tire changing apparatus for removing and installing pneumatic tires on a wheel, comprising:
a base;
wheel engaging means on the base for engaging the wheel from one side thereof with the base located on said one side, and operative to limit movement of the base with respect to the wheel;
two tools, each including an arm and a bead deflecting means at an outer end of the arm;
pivot means pivotally mounting the tools on the base for operative engagement with said one side of the wheel; and
tool driving means carried by the base for pivoting the tools in opposite directions on the base.

The use of two tools operating in opposite directions balances the forces on the wheel and tire, so that there is no tendency of the wheel to rotate in reaction to a bead lifting or depressing force. By seating the changer on one side of the wheel, it can be used on a wheel lying on the ground, on a truck bed or other surface. There is no need to anchor the wheel to a fixed structure.

In preferred embodiments of the invention, the base and tool arms are connected with a sliding pivot so that the changer automatically adapts to an wheel size within its capacity.

BRIEF DESCRIPTION OF THE DRAWINGS

In the accompanying drawings, which illustrate an exemplary embodiment of the present invention:
FIG. 2 is a plan view of the changer tools;
FIG. 3 is a side elevation of the tools.

DETAIL DESCRIPTION

Figure 1:
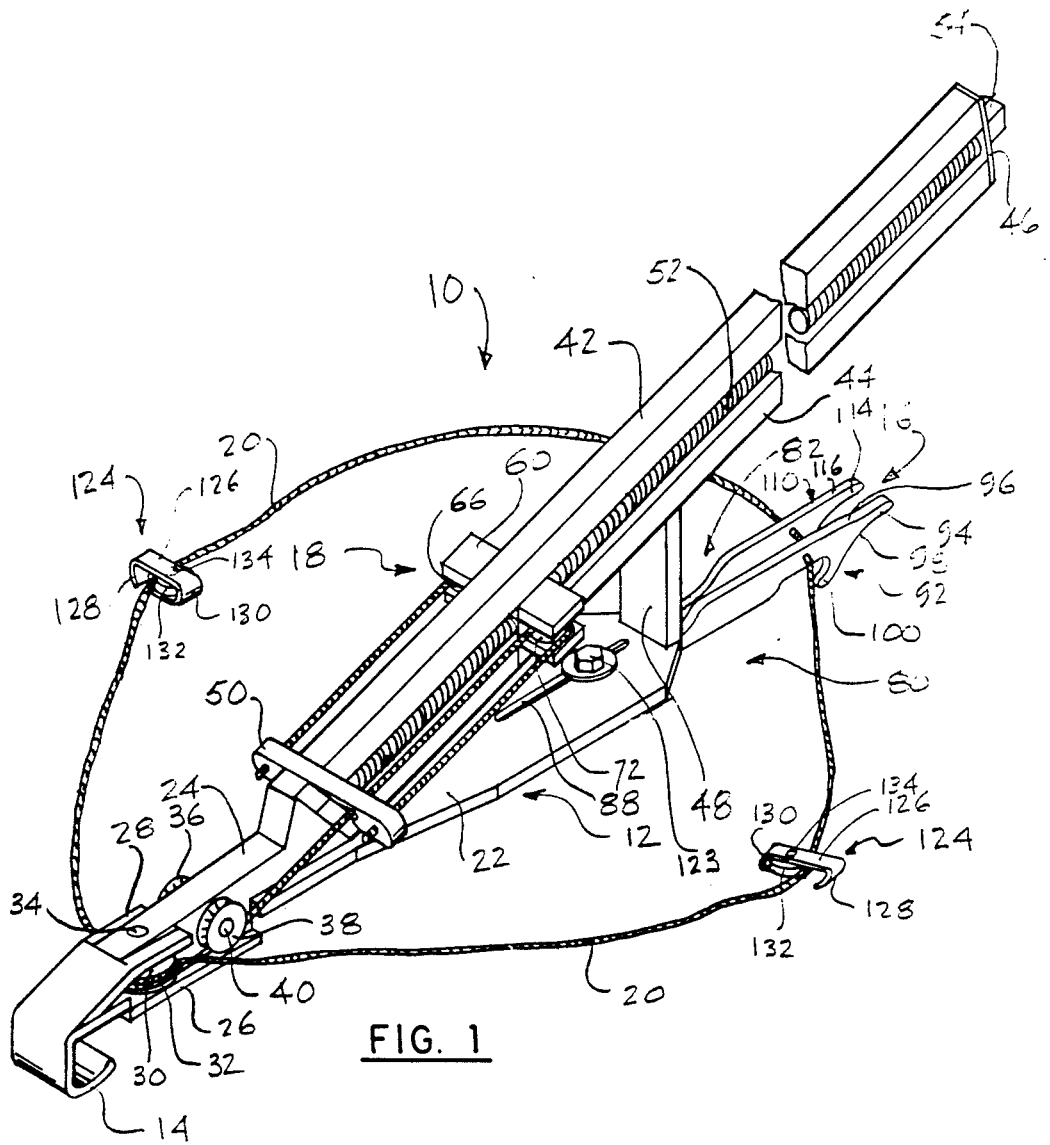
FIG. 1 is an isometric view of a tire changer.

Referring to the accompanying drawings, there is illustrated a tire changer 10 with a base 12 carrying a wheel rim engaging hook 14 at one end. Tools 16 are pivotally mounted on the base. These engage wheel rims and tire beads as described more fully in the following for mounting and dismounting the tires on the wheels. A tool drive 18 is mounted on the base and is connected to the tools by cables 20, which serve to drive the tools around the wheel rim for tire removal or installation.

The base 12 of the changer 10 includes an elongate, flat base plate 22 connected at one end to the bottom of a vertical support 24. The support extends to the front of and below the base plate 22 and carries a bottom front plate 26 and a top front plate 28 parallel to the base plate. Plates 26 and 28 accommodate between them two sheaves 30 and 32 mounted on a common shaft 34. In front of the sheaves, the plates 26 and 28 are connected to the rim engaging hook 14.

Immediately behind the sheaves 30 and 32, the support 24 carries two vertical sheaves 36 and 38, one on each side. The sheaves 36 and 38 are mounted on a common shaft 40 perpendicular to the shaft 34. The sheaves 30, 32, 36 and 38 are arranged so that the plane where sheaves 30 and 32 meet is tangential to the bases of the grooves in the sheaves 36 and 38. This ensures that cables running over the sheaves 30 and 32 to the sheaves 36 and 38 will be equally deflected.

Two parallel, square bars 42 and 44 slope upwardly from the rear of the support plate 24. They are joined at their upper ends by a rectangular end plate 46. A support 48 joins the lower bar 44 to the end of the base plate 22.

An anchor plate 50 extends transversly of the bars 42 and 44, near their juncture with the support plate 24. A lead screw 52 is positioned between the bars 42 and 44. It passes through aligned bores in the end plate 46 and the anchor plate 50. The upper end of the lead screw carries a hexagonal head 54 that is engageable with a conventional wrench.

Figure 7:
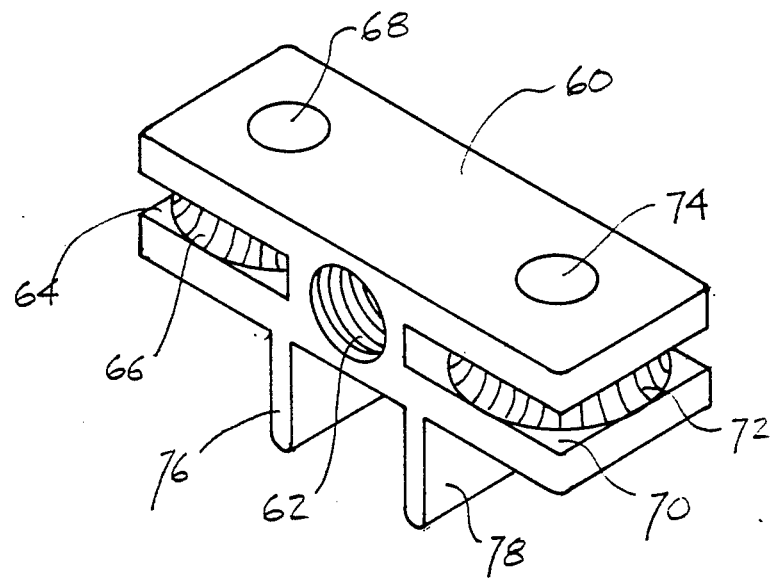
FIG. 7 is an isometric view of a sheave block.

A nut 60 with a threaded bore 62 serves as a sheave block carried by the lead screw between the anchor plate 50 and the end plate 46. The configuration of the sheave block is illustrated in FIG. 7. On one side of the bore 62, the block has a recess 64 accommodating a sheave 66 rotatable on a shaft 68. On the opposite side, a recess 70 accommodates a sheave 72 rotatable on a shaft 74. The shafts 68 and 74 are parallel, and perpendicular to the lead screw. Two parallel plates 76 and 78 are secured to the bottom face of the block 60 and ride on opposite sides of the bar 44.

The two tools 16 include a left tool 80 and a right tool 82. The left tool has a tool arm 84 in the form of a flat plate with an elongate slot 86. The arm 84 is positioned immediately below the base plate 22 with the slot 86 intersecting an elongate slot 88 in the base plate. At its outer end, the arm has an offset section 90 carrying a bead deflector 92. The bead deflector includes a point 94 with a faired lifting surface 96 on the top and a faired depressing surface 98 on the bottom. The depressing surface extends from the point to the underside of a rim engaging hook 100 formed on the bottom of the bead deflector 92. A transverse hole 102 serves as an attachment point for a cable.

The right tool 82 is complementary to the left tool 80. It includes an arm 104 in the form of a flat plate that is the mirror image of the arm 84. The arm 104 is positioned on the underside of the arm 84 with its slot 106 intersecting the slots 86 and 88. The offset section 108 of the arm 104 carries a bead deflector 110. The deflector 110 has a vertically offset section 112 that brings the point 114 of the deflector 110 into horizontal alignment with the point 94 of the bead deflector 92. The point 114 has a faired lifting surface 116 on the top and a faired depressing surface 118 that extends into the under surface of a rim engaging hook 120. A hole 122 serves as an anchor for a cable end. A pivot pin 123 extends through the slots 86, 88 and 106 and joins the two tool arms to the base plate for pivoting and sliding movement of the three components on the pivot pin.

The tire changer also includes two cable deflectors 124. Each of these is a plate 126 formed at one end into a hook 128 and at the other end to a U-shaped bight 130 accommodating a sheave 132 rotatable on a shaft 134.

Figure 4:
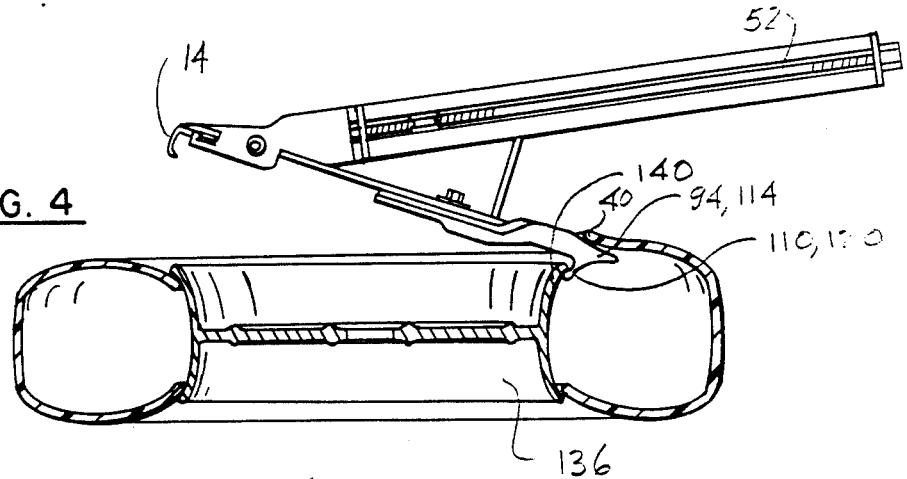
FIG. 4 is a schematic side elevation, partially in section, showing the installation of the changer on a wheel for tire removal.
Figure 5:
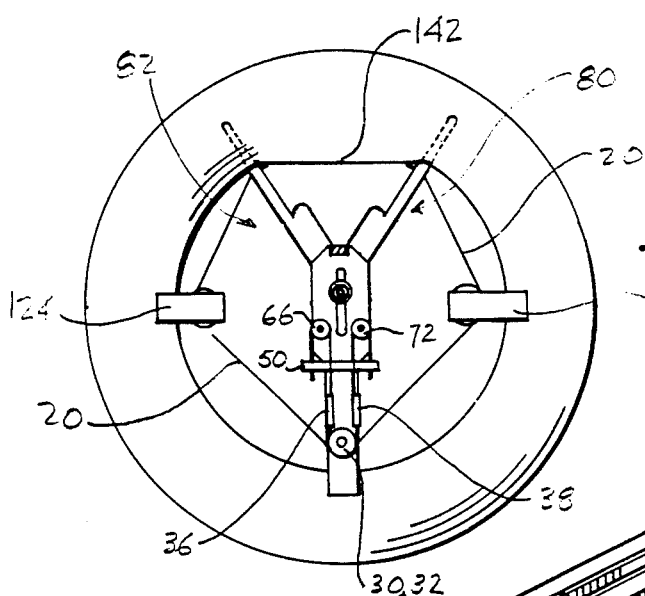
FIG. 5 is a schematic plan view showing the removal of a tire.

The use of the tire changer in the removal of a tire from a wheel 136 is illustrated most particularly in FIGS. 4 and 5. Initially, the two tools are arranged side by side, opposite the rim engaging hook 14. The changer is tipped up and the bead deflector points 94 and 114 are inserted between the wheel rim 138 and the bead 140 of a tire 142. The deflectors are inserted sufficiently that the hooks 100 and 120 engage over the rim 140. The angling of the tool drive lead screw 52 and its supporting structure upwardly and away from the base plate 22 avoids interference of the tool drive with the tire during this operation.

Once the bead deflectors have been inserted, the base plate is drawn down against the wheel rim 138 to engage the hook 14 onto the rim opposite the tools. The slots 86, 88 and 106 allow the base plate and the tools to move with respect to one another to accommodate any size of wheel rim within the range of the changer, which is limited by the maximum and minimum excursion of the arms with respect to the base plate.

Once the hook 14 has been engaged, the two cable deflectors are engaged with the wheel rim at positions midway between the hook 14 and the tools. At this time one of the cables 20 extends from the tool 80, through one of the cable deflectors, around the sheave 30, under the sheave 36, around the sheave 66 and to the anchor plate 50. The other cable 20 is similarly anchored to tool 82, extends around the other cable deflector 124, the sheave 32, the sheave 38, the sheave 72 and is anchored to the anchor plate 50. It will be observed that in extending from the sheaves 36 and 38 to the sheaves 66 and 72, the cables 20 pass through openings formed in the anchor plate for this purpose.

With the tire changer in this condition, the lead screw is rotated to draw the block 60 upwardly along the lead screw, thus drawing in on the cables 20 and causing the tools to rotate in opposite directions away from one another. The lifting surfaces 96 and 116 of the tool points lift the tire bead 142 off the wheel rim 140. When the tools reach a point approximately one-half way around the tire rim, the bead comes free of the rim. If necessary, the cable deflectors can be repositioned by slackening the cables. The same procedure may be followed for removing the second bead, so that the tire is completely freed from the rim.

Figure 6:
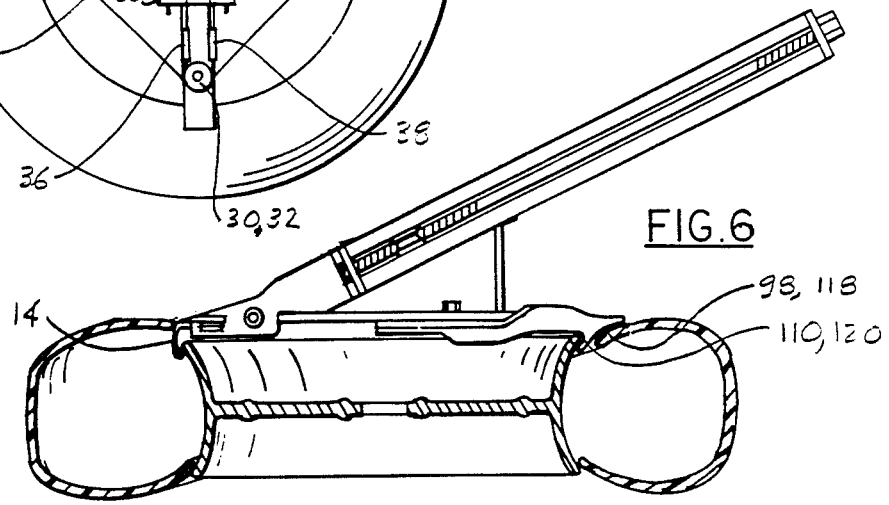
FIG. 6 is a schematic side elevation, partially in section, showing the installation of the changer on a wheel for tire mounting.

The installation of a tire on a wheel rim is illustrated in FIG. 6. In this case, the hook 14 and the hooks 100 and 120 are engaged over the wheel rim, with the bead depressing surfaces 98 and 118 of the tools engaging the tire bead and pressing it down under the rim. The tools are then rotated manually towards the hook 14 until the bead resists their further movement. The cable deflectors are then located half-way between the tools and the hook 14, and engaged with the cables. The lead screw is then rotated using a wrench to draw the tools towards the hook 14 while pressing the bead over the rim. As the tools approach the cable deflectors, the lead screw can be rotated to slack off the cable, allowing the removal of the cable deflectors or their movement to positions closer to the hook 14.

While one embodiment of the present invention has been described in the foregoing, it is to be understood that the invention is not to be considered limited to that embodiment. The scope of the invention is to be ascertained solely by reference to the appended claims.

I claim:

1. A tire changing apparatus for removing and installing pneumatic tires on a wheel, comprising:
    a base;
    wheel engaging means on the base for engaging the wheel from one side thereof with the base located on said one side, and operative to limit movement of the base with respect to the wheel;
    two tools, each including an arm, a bead deflecting means at an outer end of the arm and adjustment means for adjusting the lengths of the tool arms between the bead deflecting means and the pivot means, the adjustment means comprising a slot extending along each arm and slideably engaged with the pivot means;
    pivot means pivotally mounting the tools on the base for operative engagement with said one side of the wheel; and
    tool driving means carried by the base for pivoting the tools in opposite directions on the base.

2. An apparatus according to claim 1 wherein the adjustment means further comprise slot means extending along the base and slideably engaging the pivot means.

3. An apparatus according to claim 1, wherein the bead deflecting means comprise a bead lifting point engageable between a tire bead and rim of the wheel.

4. An apparatus according to claim 3 wherein the bead deflecting means comprise a hook for engaging over the rim of the wheel and spaced towards the pivot means from the bead lifting point, and a faired surface extending along an under surface of the hook and the point.

5. An apparatus according to claim 1, wherein the tool driving means comprise two cables connected to respective ones of the tools and extending from the tools to a position on the base adjacent a rim of the wheel, and means for drawing on the cables simultaneously.

6. An apparatus according to claim 5, wherein the means for drawing on the cables comprise fixed anchor means secured to the ends of the cables, sheave means engaging the cables and means for displacing the sheave means.

7. An apparatus according to claim 6 wherein the means for displacing the sheave means comprise a nut carrying the sheave means and a lead screw rotatably mounted on the base and engaging the nut.

8. An apparatus according to claim 1, wherein the wheel engaging means comprise a hook mounted on the base for engaging a rim of the wheel.

9. A tire changing apparatus for removing and installing pneumatic tires on a wheel, comprising:

a base;

wheel engaging means on the base for engaging the wheel from one side thereof with the base located on said one side, and operative to limit movement of the base with respect to the wheel;

two tools, each including an arm, and a bead deflecting means at an outer end of the arm;

pivot means pivotally mounting the tools on the base for operative engagement with said one side of the wheel; and tool driving means carried by the base for pivoting the tools in opposite directions on the base the tool driving means comprising two cables connected to respective ones of the tools and extending from the tools to a position on the base adjacent a rim of the wheel, means for drawings on the cables simultaneously and two cable deflectors, each comprising a hook engageable with a rim of the wheel and a sheave mounted on the hook for engaging and deflecting a respective one of the cables between the tool and said position on the base.

10. A tire changing apparatus comprising:

an elongate base;

means for connecting the base to a wheel;

two tools having respective arms pivotally connected to the base and having tire bead deflecting means at outer ends thereof:

a lead screw rotatably mounted on the base;

a nut threaded on the lead screw;

flexible cables connected to the tool arms adjacent the outer ends thereof;

sheave means for leading the cables from the tool arms around opposite sides of the base to the nut; and two cable deflectors, each comprising a hook engageable with a rim of the wheel and a sheave mounted on the hook for engaging and deflecting a respective one of the cables between the associated tool arm and the sheave mans, whereby rotating of the lead screw in one directing will draw in the cables and pivot the tools in opposite directions around the base.

* * * * *